United States Patent
Coombe et al.

(10) Patent No.: US 10,140,765 B2
(45) Date of Patent: Nov. 27, 2018

(54) STAGED CAMERA TRAVERSAL FOR THREE DIMENSIONAL ENVIRONMENT

(71) Applicant: Google Inc., Mountain View, CA (US)

(72) Inventors: Greg Coombe, Mounatain View, CA (US); Francois Bailly, Mountain View, CA (US)

(73) Assignee: Google LLC, Mountain View, CA (US)

( * ) Notice: Subject to any disclaimer, the term of this patent is extended or adjusted under 35 U.S.C. 154(b) by 1171 days.

(21) Appl. No.: 13/775,308

(22) Filed: Feb. 25, 2013

(65) Prior Publication Data

US 2014/0240318 A1 Aug. 28, 2014

(51) Int. Cl.
*G06T 19/00* (2011.01)

(52) U.S. Cl.
CPC .................. *G06T 19/003* (2013.01)

(58) Field of Classification Search
CPC ............. G06T 19/003; G06F 17/30811; G06F 17/30058
See application file for complete search history.

(56) References Cited

U.S. PATENT DOCUMENTS

| | | | |
|---|---|---|---|
| 5,276,785 A * | 1/1994 | Mackinlay et al. | 345/427 |
| 6,104,406 A | 8/2000 | Berry et al. | |
| 6,500,069 B1 | 12/2002 | Ohba et al. | |
| 7,148,892 B2 | 12/2006 | Robertson et al. | |
| 7,933,395 B1 * | 4/2011 | Bailly et al. | 379/201.04 |
| 2004/0001110 A1 | 1/2004 | Khan | |
| 2009/0256840 A1 | 10/2009 | Varadhan et al. | |
| 2009/0259976 A1 * | 10/2009 | Varadhan et al. | 715/850 |
| 2010/0026712 A1 * | 2/2010 | Aliprandi et al. | 345/629 |
| 2010/0045666 A1 | 2/2010 | Kornmann et al. | |

* cited by examiner

*Primary Examiner* — Xiao Wu
*Assistant Examiner* — Chong Wu
(74) *Attorney, Agent, or Firm* — Dority & Manning, P.A.

(57) ABSTRACT

A staged camera traversal for navigating a virtual camera in a three dimensional environment is provided. The staged camera traversal can include a launch stage and an approach stage. During the launch stage, the tilt angle can be decreased towards zero tilt (i.e. straight down) with respect to the vertical. During an approach stage, the tilt angle of the virtual camera can be increased from about zero tilt towards the tilt angle associated with a target location. In certain implementations, the staged camera traversal can further include a traversal stage occurring between the launch stage and the approach stage. The tilt angle of the virtual camera can be maintained at about zero tilt during the traversal stage. The approach path of the virtual camera can be aligned along a view direction associated with the target destination during the approach stage.

4 Claims, 8 Drawing Sheets

STAGED CAMERA TRAVERSAL FOR THREE DIMENSIONAL ENVIRONMENT

FIELD

The present disclosure relates generally to navigating a three dimensional environment, and more particularly to moving a virtual camera in a three dimensional environment.

BACKGROUND

Systems exist for navigating through a three dimensional environment to display three dimensional data. The three dimensional environment includes a virtual camera. The virtual camera has a perspective that defines what three-dimensional data to display to a user. By changing the position and orientation of the virtual camera, a user can navigate through the three dimensional environment.

One type of system that uses a virtual camera to navigate through a three dimensional environment is a geographic information system. A geographic information system can provide for the archiving, retrieving, and manipulating of data that has been stored and indexed according to geographic coordinates of its elements. A geographic information system can provide for the display of a three dimensional model of a globe, such as the Earth. The three dimensional model can include satellite images texture mapped to terrain, such as mountains, valleys, and canyons. Further, the three dimensional model can include buildings and other three dimensional features.

A user can request to move a virtual camera between two different camera viewpoints. When moving between different camera views, camera parameters are typically interpolated during the camera traversal. If the initial and final camera views are highly tilted relative to the three dimensional model, the midpoint of the traversal can also be highly tilted. For instance, if the initial tilt angle is 55 degrees and the final heading is 35 degrees, the tilt angle at the middle of the camera traversal will be 45 degrees. This can be disorienting for a user and can cause the user to lose context during the camera traversal.

SUMMARY

Aspects and advantages of the invention will be set forth in part in the following description, or may be obvious from the description, or may be learned through practice of the invention.

One exemplary aspect of the present disclosure is directed to a computer-implemented method of navigating a virtual camera. The method includes presenting a view of a three dimensional model from a virtual camera at a first location. The virtual camera has a first tilt angle at the first location. The method further includes receiving a user input requesting transition of the virtual camera to a second location. The virtual camera has a second tilt angle at the second location. Responsive to the user input, the method includes transitioning the virtual camera from the first location to the second location according to a staged camera traversal having a launch stage and an approach stage. Transitioning the virtual camera from the first location to the second location according to the staged camera traversal includes decreasing a tilt angle of the virtual camera from the first tilt angle towards zero tilt during the launch stage and increasing the tilt angle of the virtual camera towards the second tilt angle during the approach stage.

Other exemplary aspects of the present disclosure are directed to systems, apparatus, non-transitory computer-readable media, user interfaces and devices for navigating a virtual camera in a three dimensional environment.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to moving a virtual camera in a three dimensional environment, such as three dimensional environment provided by a geographic information system. In particular, a user can request navigation of virtual camera from a first location to a target location. In response to the user request and without further user interaction, the virtual camera can be navigated in the three dimensional environment between distant locations having tilted viewpoints according to a staged camera traversal having a launch phase and an approach stage.

During the launch stage of the staged camera traversal, the tilt angle can be decreased towards zero tilt (i.e. straight down) with respect to the vertical. During an approach stage of the staged camera traversal, the tilt angle of the virtual camera can be increased from about zero tilt towards the tilt angle associated with a target location. In certain implementations, the staged camera traversal can further include a traversal stage occurring between the launch stage and the approach stage. The tilt angle of the virtual camera can be maintained at about zero tilt during the traversal stage.

To keep the target location in view during the approach stage of the staged camera traversal, the approach path of the virtual camera can be aligned along a view direction associated with the target destination. In particular, as the virtual camera approaches the target destination, the virtual camera can be pulled closer and closer to the view direction such that the virtual camera focuses on the target destination during the approach stage. The staged camera traversal according to aspects of the present disclosure can provide a visually pleasing transition between distant tilted camera views that allows the user to maintain context during the transition.

Figure 1:
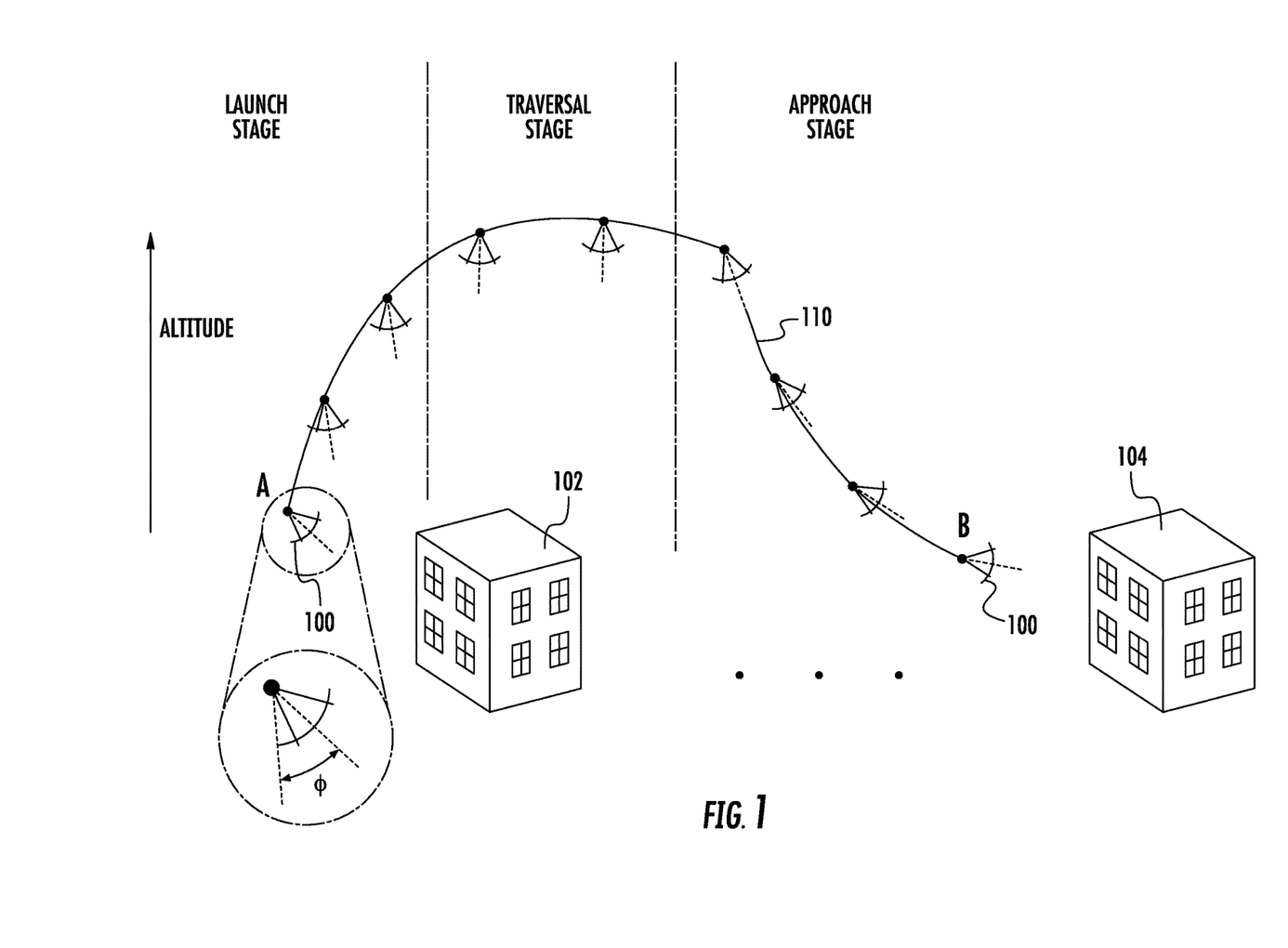
FIG. 1 depicts an overview of a staged camera traversal for a virtual camera according to an exemplary embodiment of the present disclosure.

FIG. 1 depicts an overview of the staged camera traversal according to exemplary aspects of the present disclosure. FIG. 1 shows a virtual camera 100 at a first location A. The virtual camera 100 can provide a perspective of a first object 102 in a three dimensional environment, such as a building in a geographic information system. The virtual camera 100 is tilted at a first tilt angle at the first location A. The tilt angle of the virtual camera is the angle φ with respect to the vertical.

A user can request to navigate the virtual camera 100 to a second location B. The virtual camera 100 can provide a perspective of a second object 104 at the second location B, such as a different building in the geographic information system. The first object 102 and the second object 104 can be distanced apart in the geographic information system. As illustrated, the virtual camera 100 is tilted at a second tilt angle at the second location B.

Under a typical camera traversal, the tilt angle of the virtual camera 100 during navigation from the first location A to the second location B can be determined using interpolation techniques. Given that the first tilt angle and the second tilt angle are relatively high tilt angles, the tilt angle at the middle of the camera traversal using standard interpolation techniques can also be highly tilted, causing the user to lose context during the transition. For instance, the virtual camera 100 can be tilted away from the three-dimensional model during the transition.

According to aspects of the present disclosure, the virtual camera 100 is transitioned along trajectory 110 from the first location A to the second location B using a staged camera traversal having a launch stage, a traversal stage, and an approach stage. As illustrated, the tilt angle of the virtual camera 100 is decreased from the first tilt angle towards zero tilt (i.e. straight down) during the launch stage. The virtual camera 100 also increases in altitude away from the first location A during the launch stage.

After the launch stage, the virtual camera 100 enters the traversal stage. During the traversal stage, the tilt angle of the virtual camera 100 is maintained at about zero tilt. As used herein, the term "about zero tilt" refers to within 15° of zero tilt. The altitude of the virtual camera 100 also remains relatively constant during the traversal stage. By maintaining the virtual camera 100 at about zero tilt during the traversal stage, the user can more easily visually observe the location of the virtual camera 100 relative to the three dimensional model during the transition.

After the traversal stage, the virtual camera 100 enters the approach stage where the virtual camera transitions to the second location B. As illustrated, the tilt angle of the virtual camera 100 is increased towards the second tilt angle during the approach stage. In addition the virtual camera 100 decreases in altitude so that the virtual camera 100 lands at the second location B.

During the approach stage, the virtual camera 100 can tilt away from the target location as the virtual camera travels towards the second location B. This can cause the user to lose context during the transition. For instance, the virtual camera 100 can provide a perspective that feels as if the user is floating down on top of the destination as opposed to traveling towards the destination.

To provide a more visually pleasing approach for the virtual camera 100 during the approach stage, the approach path of the virtual camera 100 can be aligned with a view direction associated with the target location. In a particular implementation, the approach path can be aligned with a view direction by blending two camera paths: (1) a standard approach camera path; and a (2) camera path that steps backward along the view direction associated with the target location. Camera parameters associated with the standard approach camera path can be blended with camera parameters associated with the camera path that steps backward along the view direction associated with the second location. Camera parameters include information associated with the virtual camera that can be used to define the position and orientation of the virtual camera with respect to the three-dimensional model. Camera parameters can include: (1) heading (e.g. pitch and roll), (2) tilt angle with respect to vertical, (3) position (e.g. lat./lon./alt.); and (4) other camera parameters. The blending of the camera paths can be accomplished by providing for a spherical linear interpolation of the tilt angles and a separate spherical linear interpolation of the camera positions. In this manner, the approach path can be aligned along the final view direction during the approach stage to permit the user to maintain perspective of the target during the approach stage.

Figure 2:
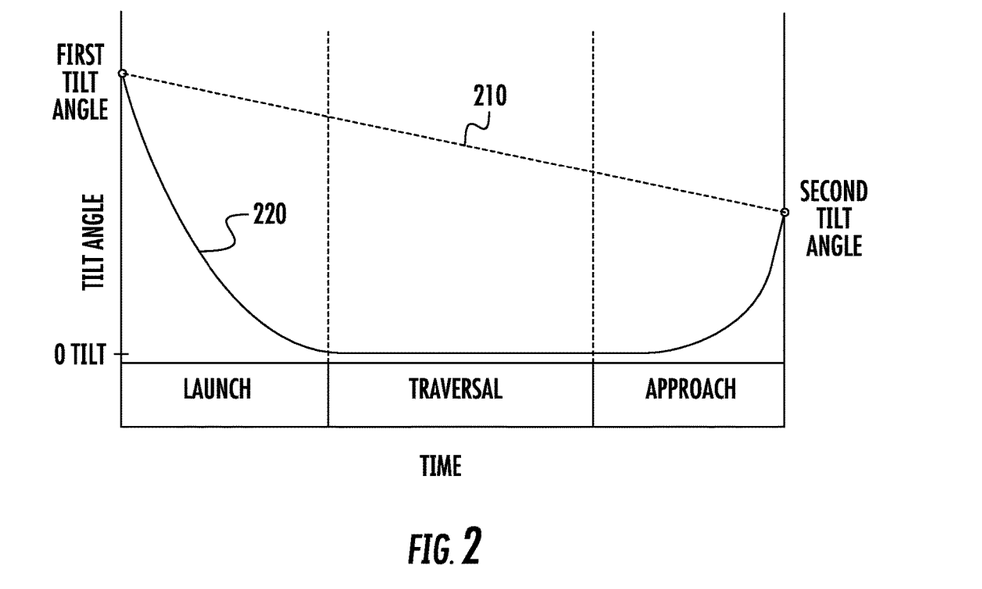
FIG. 2 depicts a graphical representation of a staged camera traversal according to an exemplary embodiment of the present disclosure.

FIG. 2 depicts a graphical representation of the tilt angle of a virtual camera over time. In particular, curve 210 depicts the tilt angle of a virtual camera over time as the virtual camera is transitioned using typical interpolation techniques. As shown, the tilt angle of the virtual camera remains relatively high during the entire camera transition. The high tilt angle can cause the virtual camera to provide a perspective towards a horizon of the three-dimensional model during the transition, making it difficult for the user to gauge location during the transition.

Curve 220 depicts the tilt angle of a virtual camera over time as the virtual camera is transitioned according to an exemplary staged camera traversal according to an exemplary embodiment of the present disclosure. As shown, the traversal period of the camera traversal is divided into three stages including a launch stage, a traversal stage and an approach stage. During the launch stage, the tilt angle of the virtual camera is gradually decreased from the first tilt angle to zero tilt for a first period of time. During the traversal stage, the tilt angle of the virtual camera is maintained at about zero tilt for a second period of time. During the approach stage, the tilt angle of the virtual camera is gradually increased from zero tilt to the second tilt angle for a third period of time. The tilt angle can be adjusted during the launch stage and the approach stage according to a smoothing algorithm, such as a second order smoothing algorithm, to provide a smoother transition.

Figure 3:
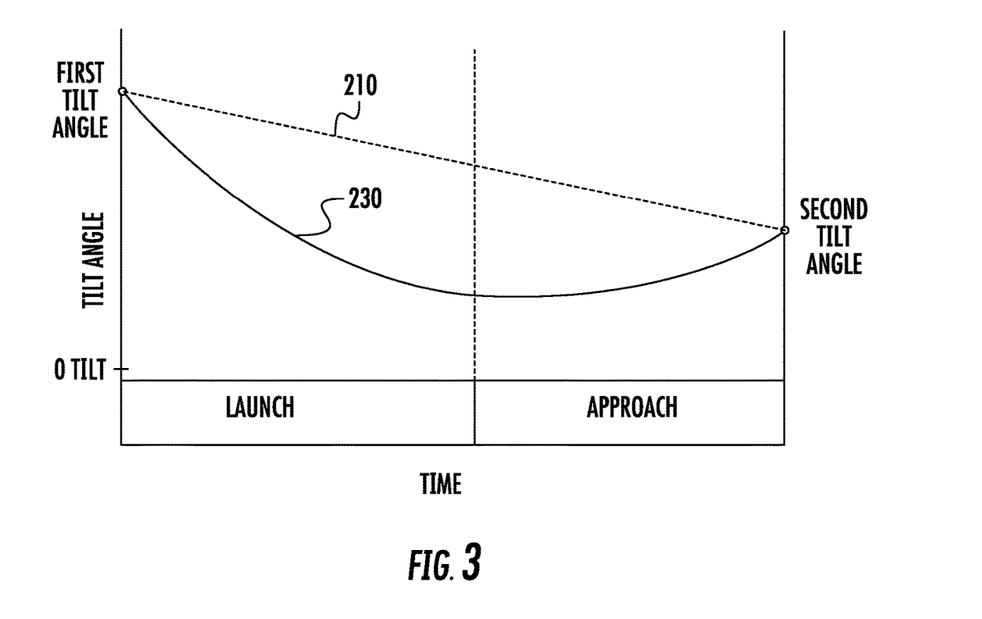
FIG. 3 depicts a graphical representation of a staged camera traversal according to an exemplary embodiment of the present disclosure.

FIG. 3 depicts a graphical representation of the tilt angle of a virtual camera over time according to another exemplary staged camera traversal according to an exemplary embodiment of the present disclosure. In particular, curve 230 depicts the tilt angle of a virtual camera over time as the virtual camera is transitioned according to a staged camera traversal having a launch stage and an approach stage. The staged camera traversal represented by curve 230 does not include a traversal stage occurring between the launch stage and the approach stage. During the launch stage, the tilt angle of the virtual camera is gradually decreased from the first tilt angle towards zero tilt for a first period of time. During the approach stage, the tilt angle of the virtual camera is gradually increased towards the second tilt angle for a second period of time. Similar to the camera traversal represented by curve 220 of FIG. 2, the tilt angle can be adjusted during the launch stage and the approach stage according to a smoothing algorithm, such as a second order smoothing algorithm, to provide a smoother transition.

The staged camera traversal according to aspects of the present disclosure is particularly suitable for long camera transitions. It may not be desirable to use the staged camera traversal for shorter camera distances as it can cause the virtual camera to jump around unnecessarily. In addition, the staged camera traversal is more suited for transitions between camera views with relatively high tilt angles. In that regard, the staged camera traversal according aspects of the present disclosure can be enabled or disabled depending on the circumstances surrounding the camera transition.

Figure 4:
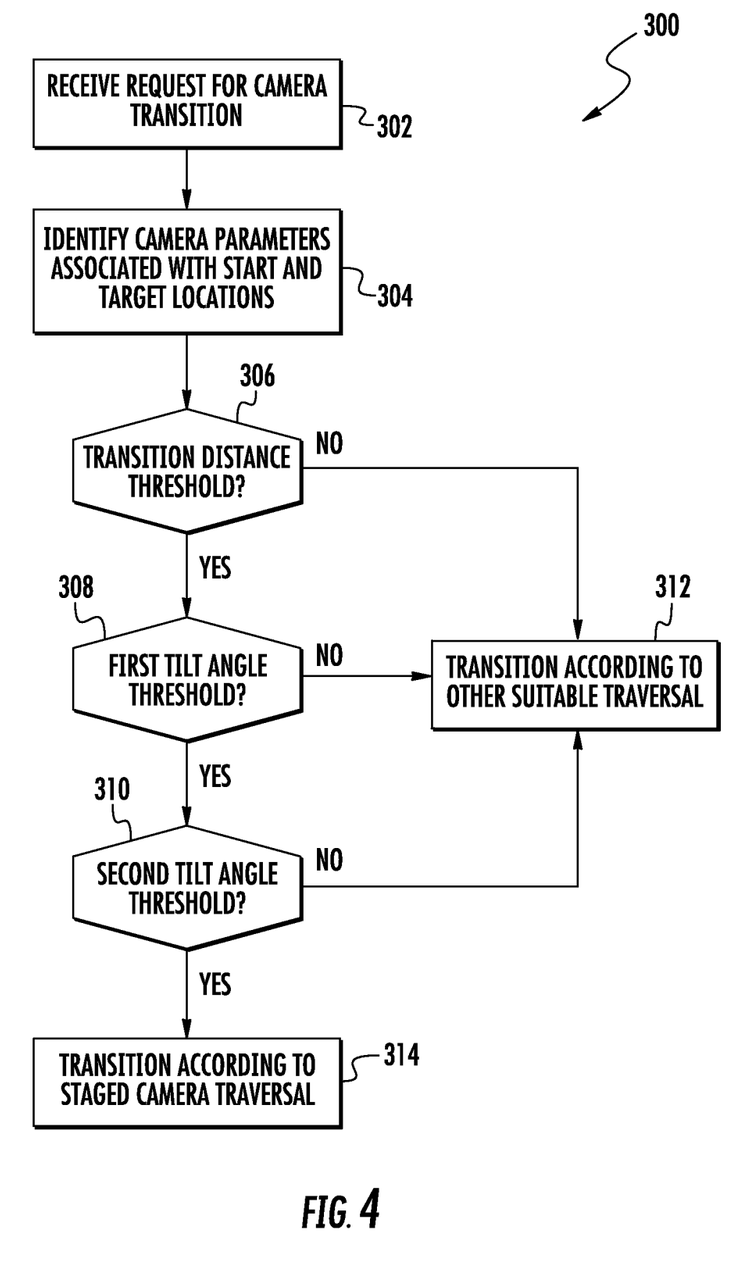
FIG. 4 depicts a flow diagram of an exemplary method for navigating a virtual camera in a three dimensional environment according to an exemplary embodiment of the present disclosure.

In particular, FIG. 4 depicts a flow diagram of an exemplary computer-implemented method (300) for navigating a virtual camera in a three dimensional environment according to an exemplary embodiment of the present disclosure. The method (300) can be implemented using any suitable computing system, such as the system depicted in FIG. 9. In addition, the flow charts provided herein depict steps performed in a particular order for purposes of illustration and discussion. One skilled in the art, using the disclosures provided herein, will appreciate that various steps of the methods discussed herein can be omitted, rearranged, combined and/or adapted in various ways.

At (302), the method includes receiving a request for a camera transition. The request can specify a transition of a virtual camera from a first camera view at a starting location in a three-dimensional environment to a second camera view at a target location in the three-dimensional environment. The request can be received in any suitable manner using any suitable input device. For instance, a user can provide the request via a suitable graphical user interface. In addition, the request can be provided as part of an automated camera transition in the three-dimensional environment, such as a transition that occurs as part of a virtual tour.

At (304), the method includes identifying camera parameters associated with the starting and target locations for the transition. For instance, camera parameters such as tilt angle, heading, and position associated with the starting location can be identified from the current location of the virtual camera. Camera parameters associated with the target location can be specified in the request or can be otherwise associated with the target location. For instance, camera parameters can be identified to provide a best or most popular perspective of the three-dimensional environment at the target location.

Once the camera parameters associated with virtual camera at the starting and target location have been identified, the method can determine whether to enable or disable the staged camera traversal according to aspects of the present disclosure based on the camera parameters, such as based on distance between starting location and target location and tilt angles associated with the starting location and the target location.

For instance, at (306) the method can determine whether the transition distance between the starting location and the target location exceeds a predefined threshold. An exemplary predefined threshold in the context of a geographic information system providing a three-dimensional model of the Earth can be 600 km. If the transition distance is not greater than the predefined threshold, the method can disable the staged camera traversal and transition according to another suitable traversal algorithm (312). In this manner, the staged camera traversal is not used for shorter camera transitions and unnecessary camera movement during shorter camera transitions can be avoided.

If the transition distance does exceed the threshold, the method can continue to (308), where it can determined whether the first tilt angle associated with the starting location exceeds a predefined threshold, such as 10° from vertical. If so, the method can continue to (310) where it can be determined whether the second tilt angle associated with the target location exceeds a predefined threshold, such as 10° from vertical. If both the first tilt angle and the second tilt angle exceed the predefined threshold, the camera can be transitioned pursuant to a staged camera traversal according to exemplary aspects of the present disclosure (314). Otherwise, the method can disable the staged camera traversal and transition according to another suitable traversal algorithm (312). As a result, the staged camera traversal can be implemented for camera transitions between viewpoints with relatively tilted views. Otherwise the staged camera transition can be disabled.

Figure 5:
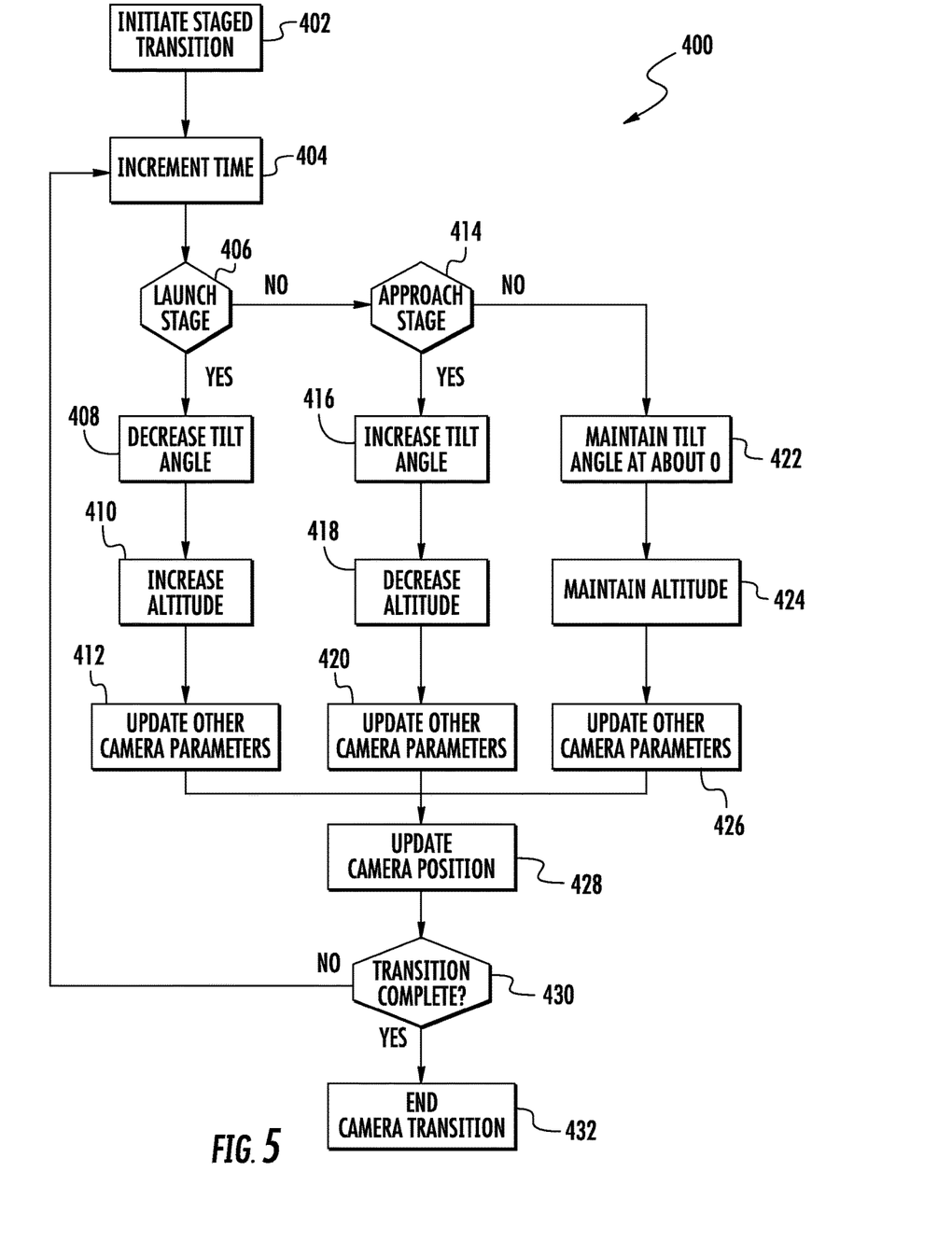
FIG. 5 depicts a flow diagram of an exemplary method for navigating a virtual camera according to a staged camera traversal in a three dimensional environment according to an exemplary embodiment of the present disclosure.

FIG. 5 depicts a flow diagram of an exemplary computer-implemented method (400) for implementing the staged camera traversal according to exemplary aspects of the present disclosure. At (402), the method includes initiating the staged camera traversal. The staged camera traversal can occur over a traversal period. The traversal period can be expressed in transition time ranging, for instance from a transition time of 0 to a transition time of 1. The staged camera traversal will progress as the transition time progresses over the traversal period. For instance, as the transition time progresses from 0 to 1, the staged camera traversal will progress through the various stages of the transition.

The traversal period can be broken into a launch stage and into an approach stage. The size of the stages can be represented as a percentage of the traversal period. For instance, the launch stage can take up 20% of the traversal period. Similarly, the approach stage can take up 20% of the traversal period. The remainder of the traversal period can be considered the traversal stage. Other suitable percentages of the traversal period can be used without deviating from the scope of the present disclosure.

At (404), the transition time is incremented to progress through the staged camera traversal. The transition time can be incremented in any suitable manner over the traversal period by any suitable increase in transition time. For instance, the transition time can be incremented from 0 to 0.05 to 0.1 to 0.15 etc. over the traversal period time. The incrementing of the transition time can be tied to a frame rate or other suitable signal. The transition time can be incremented in a linear fashion such that the transition time progresses through the traversal period at a constant rate. In other implementations, the transition time can be incremented such that transition time slows down or speeds up during portions of the traversal period. For instance, the transition time can be incremented such that the transition slows down during the approach stage of the camera traversal.

At (406), it can be determined that the transition time falls within the launch stage portion of the traversal period. For instance, if the launch stage is defined as 0.2 (i.e. 20% of the traversal period) and the transition time is less than 0.2, the method can determine that the staged camera traversal is in the launch stage. During the launch stage, the tilt angle parameter of the virtual camera can be decreased from the first tilt angle associated with the starting location towards zero tilt (408). The tilt angle parameter can be decreased according to a smoothing algorithm, such as second order smoothing algorithm. The altitude parameter of the virtual camera can also be increased (410). In addition, other camera parameters, such as position and heading, can be updated (412) using any suitable technique, such as an interpolation technique.

If the transition time does not fall within the launch stage, the method can determine at (414) that the transition time falls within the approach stage of the traversal period. For instance, if the approach stage is defined as 0.2 (i.e. 20% of the traversal period) and the transition time is in the last 20% of the traversal period (i.e. greater than 1−0.2), the method can determine that the staged camera traversal is in the approach stage. During the approach stage, the tilt angle of the virtual camera can be increased from about zero tilt towards the second tilt angle parameter associated with the target location (416). The tilt angle parameter can be increased according to a smoothing algorithm, such as second order smoothing algorithm. The altitude parameter of the virtual camera can also be decreased (418). Other camera parameters, such as position and heading, can be updated (420) using any suitable technique, such as an interpolation technique.

If the transition time does not fall within the launch stage or the approach stage, the method can determine that the transition time is within the traversal stage of the traversal period. During the traversal stage, the tilt angle parameter of the virtual camera can be maintained at about zero tilt (422). The altitude parameter of the virtual camera can be also be maintained relatively constant (424). Other camera parameters, such as position and heading, can be updated (426) using any suitable technique, such as an interpolation technique.

Once the updated camera parameters have been determined, the camera position and orientation of the virtual camera is updated according to the updated camera parameters (428). For instance, the position and orientation of the virtual camera can be adjusted to the updated tilt angle, altitude, and other camera parameters determined during the launch stage, the traversal stage, or the approach stage as set forth above.

The method can then determine whether the transition is complete at (430). For instance, the method can determine whether the transition time is equal to 1 such that the camera transition has progressed through the entire camera traversal. If the transition is complete, the staged camera traversal is ended (432). Otherwise, the method returns to (404) where the transition time is incremented and the method is repeated until the transition is complete.

Figure 6:
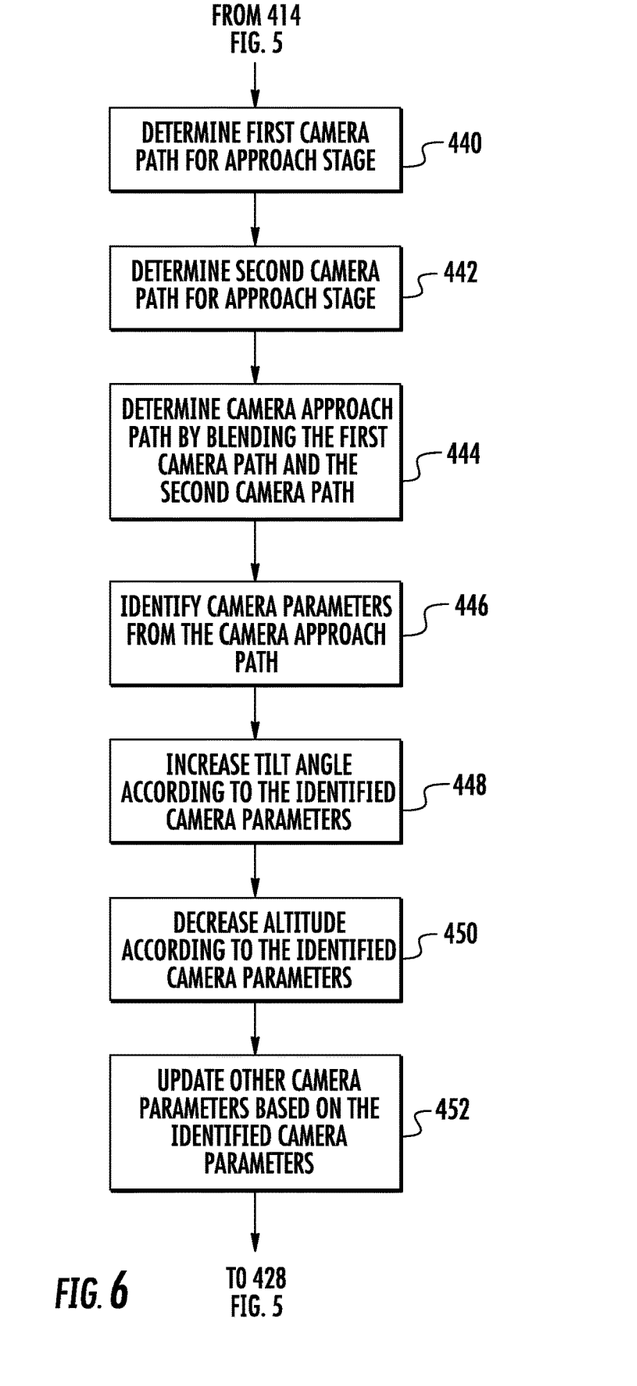
FIG. 6 depicts a flow diagram of aligning an approach path of a virtual camera with a view direction of a target location during an approach stage of a staged camera traversal according to an exemplary embodiment of the present disclosure.

According to particular aspects of the present disclosure, the camera parameters can be updated during the approach stage to align an approach path of the virtual camera with a view direction associated with the target location. FIG. 6 depicts a flow diagram of aligning an approach path of a virtual camera with a view direction associated with the target location according to an exemplary embodiment of the present disclosure. The steps depicted in FIG. 6 can be performed as part of the method (400) of FIG. 5, such as during the approach stage of the method of FIG. 5.

In particular, if it is determined that the transition time falls within the approach stage, a first camera path for the virtual camera during the approach stage can be determined (440). The first camera path defines camera parameters for a virtual camera that transitions along a path that extends along the view direction associated with the target location. In particular, the first camera path can step backward along the view direction associated with the target location.

Figure 7:
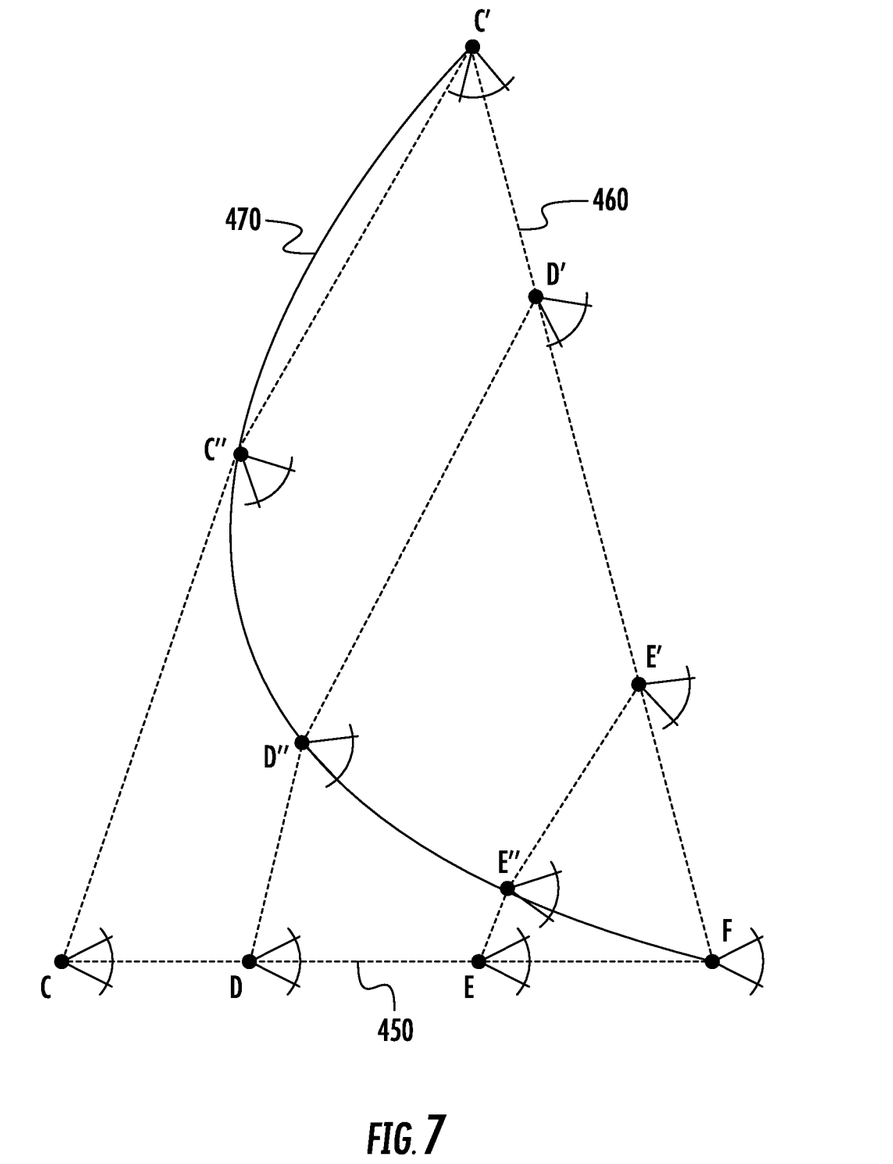
FIG. 7 depicts the exemplary blending of camera paths to determine camera parameters for an approach stage according to an exemplary embodiment of the present disclosure.

FIG. 7 depicts an exemplary first camera path 450 that is extended along the view direction associated with the target location. More particularly, the virtual camera 100 at the target location D defines a view direction. The view direction can be associated with an orientation (e.g. heading and tilt angle of the virtual camera) of the virtual camera 100 at the target location D. The first camera path 450 can be determined by stepping the virtual camera 100 backwards in position along the view direction defined by the virtual camera 100 at the target location D. The first camera path 450 defines a plurality of camera parameters for the virtual camera 100 at the various positions of the virtual camera 100 along the first camera path 450. The first camera path 450 will be used to align the approach path of the virtual camera 100 with the view direction of the target location.

At (442) of FIG. 6, a second camera path for the virtual camera during the approach stage is determined. The second camera path can define camera parameters for a virtual camera that transitions along a path determined during the approach stage of the staged camera traversal according to exemplary embodiments of the present disclosure. For instance, the tilt angle of the virtual camera can be increased towards the tilt angle associated with the target location while the altitude of the virtual camera can be decreased along the second camera path.

FIG. 7 depicts an exemplary second camera path 460. The second camera path 460 increases the tilt angle of the virtual camera 100 towards the tilt angle associated with the target location D and decreases the altitude of the virtual camera 100 as the virtual camera 100 approaches the target location D. The second camera path 460 defines a plurality of camera parameters at the various positions of the virtual camera 100 along the second camera path 460.

At (444) of FIG. 6, the approach path of the virtual camera for the approach stage of the staged camera traversal is determined by blending the first camera path and the second camera path. For instance, as shown in FIG. 7, the first camera path 450 and the second camera path 460 can be blended to determine the approach path 470 of the virtual camera 100. Camera parameters defined at particular camera positions along the first camera path 450 can be blended with camera parameters defined at corresponding positions along the second camera path 460 to determine camera parameters for the approach path 470.

For example, camera parameters for the virtual camera 100 at position C defined by the first camera path 450 can be blended with camera parameters for the virtual camera 100 at corresponding position C' defined by the second camera path 460 to determine camera parameters for the virtual camera 100 at position C" along the approach path 470. Similarly, camera parameters for the virtual camera 100 at position D defined by the first camera path 450 can be blended with camera parameters for the virtual camera 100 at corresponding position D' defined by the second camera path 460 to determine camera parameters for the virtual camera 100 at position D" along the approach path 470. Camera parameters for the virtual camera 100 at position E defined by the first camera path 450 can be blended with camera parameters for the virtual camera 100 at corresponding position E' defined by the second camera path 460 to determine camera parameters for the virtual camera 100 at position E" along the approach path 470.

Any suitable techniques can be used to blend the camera parameters. For instance, interpolation techniques can be used to blend the camera parameters. In one embodiment, spherical linear interpolation techniques are used to blend the camera parameters. Spherical linear interpolation can be appropriate for transitioning a virtual camera in a geographic information system that provides a three-dimensional model of a globe.

The spherical linear interpolation can be accomplished by providing for separate spherical linear interpolation of the orientations (tilt angle and heading) and the positions (altitude and position) defined by the first and second camera paths. The orientations can be represented by quaternion units. Quaternion units provide a mathematical notation that can be convenient for representing rotations or orientations of objects. While the present subject matter has been discussed with reference to orienting or rotating the virtual camera relative to the three dimensional model, the three dimensional model can also be rotated relative to the virtual camera without deviating from the scope of the present disclosure. The spherical linear interpolation can provide for the quaternion interpolation of the orientations represented by quaternion units defined by the first and second camera paths. The camera positions defined by the first and second camera paths can also be represented by quaternion units (e.g. a point on a sphere and an altitude). The spherical linear interpolation can provide for the quaternion interpolation of the positions represented by quaternion units defined by the first and second camera paths.

Once the approach path for the virtual camera has been determined, camera parameters for the virtual camera during the approach stage can be identified from the approach path (446). The identified parameters can be used to increase the tilt angle parameter of the virtual camera during the approach stage (448), to decrease the altitude parameter of the virtual camera during the approach stage (450), and to update other camera parameters of the virtual camera during the approach stage (452). The method can then progress through the steps of the method (400) depicted and discussed with reference to FIG. 6 until the camera transition is complete.

Figure 8:
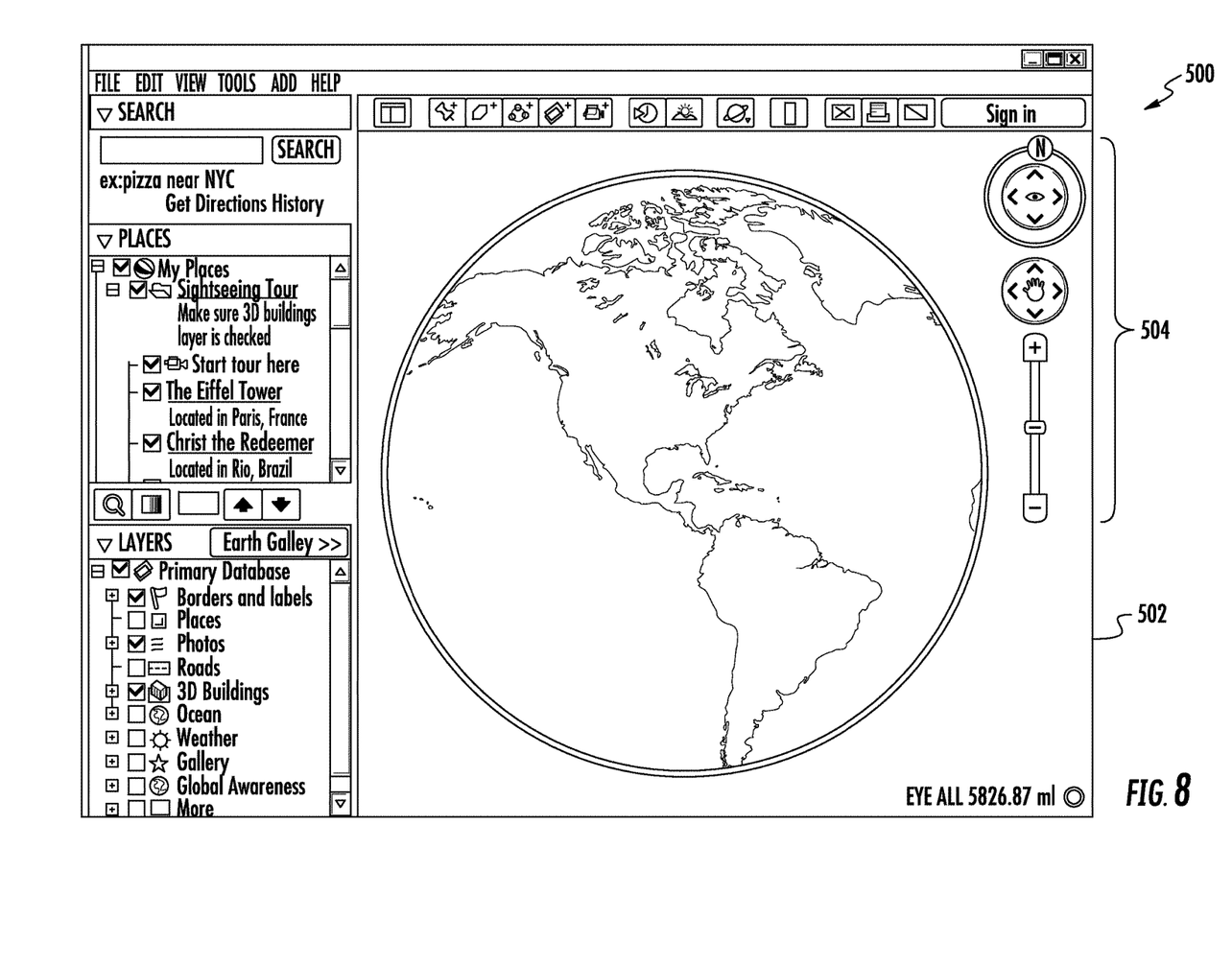
FIG. 8 depicts an exemplary graphical user interface of a geographic information system.

The staged camera traversal can be used by a geographic information system to navigate a three dimensional model of the Earth. FIG. 8 depicts an exemplary user interface 500 of a geographic information system. The user interface includes a display area 502 for displaying geographic information/data. The data displayed in the display area 502 is from the perspective of a virtual camera. In an embodiment, the perspective is defined by a frustum such as, for example, a three dimensional pyramid with the top sliced off Geographic data within the frustum can be displayed at varying levels of detail depending on its distance from the virtual camera.

Example geographic data displayed in the display area 502 can include images of the Earth. These images can be textured onto a geometry representing the Earth's terrain creating a three dimensional model of the Earth. Other data that can be displayed includes three dimensional models of buildings, trees, and other objects.

User interface 500 can include controls 504 for changing the virtual camera's orientation. Controls 504 can allow a user to change, for example, the virtual camera's altitude, latitude, longitude, heading, tilt angle, etc. In an embodiment, controls 504 can be manipulated using a computer pointing device, such as a mouse, or other input device. As the virtual camera's orientation changes, the virtual camera's frustum and geographic information/data displayed also changes. A user can request transition to a target location by selecting a position on the display area 502. The virtual camera can transition to the target location using the staged camera traversal according to exemplary aspects of the present disclosure.

The geographic information system can be operating using a client-server computer architecture. In such a configuration, the user interface 500 can be operated on a client machine. The client machine can be any suitable computing device that includes a processor, memory, display, and/or one or more input devices. The computing device can be a laptop, desktop, tablet, mobile device, smartphone, or any other suitable computing device. The client machine can communicate with one or more servers over one or more networks, such as the internet. Similar to the client machine, the server can be implemented using any suitable computing device capable of serving data to the client machine.

Figure 9:
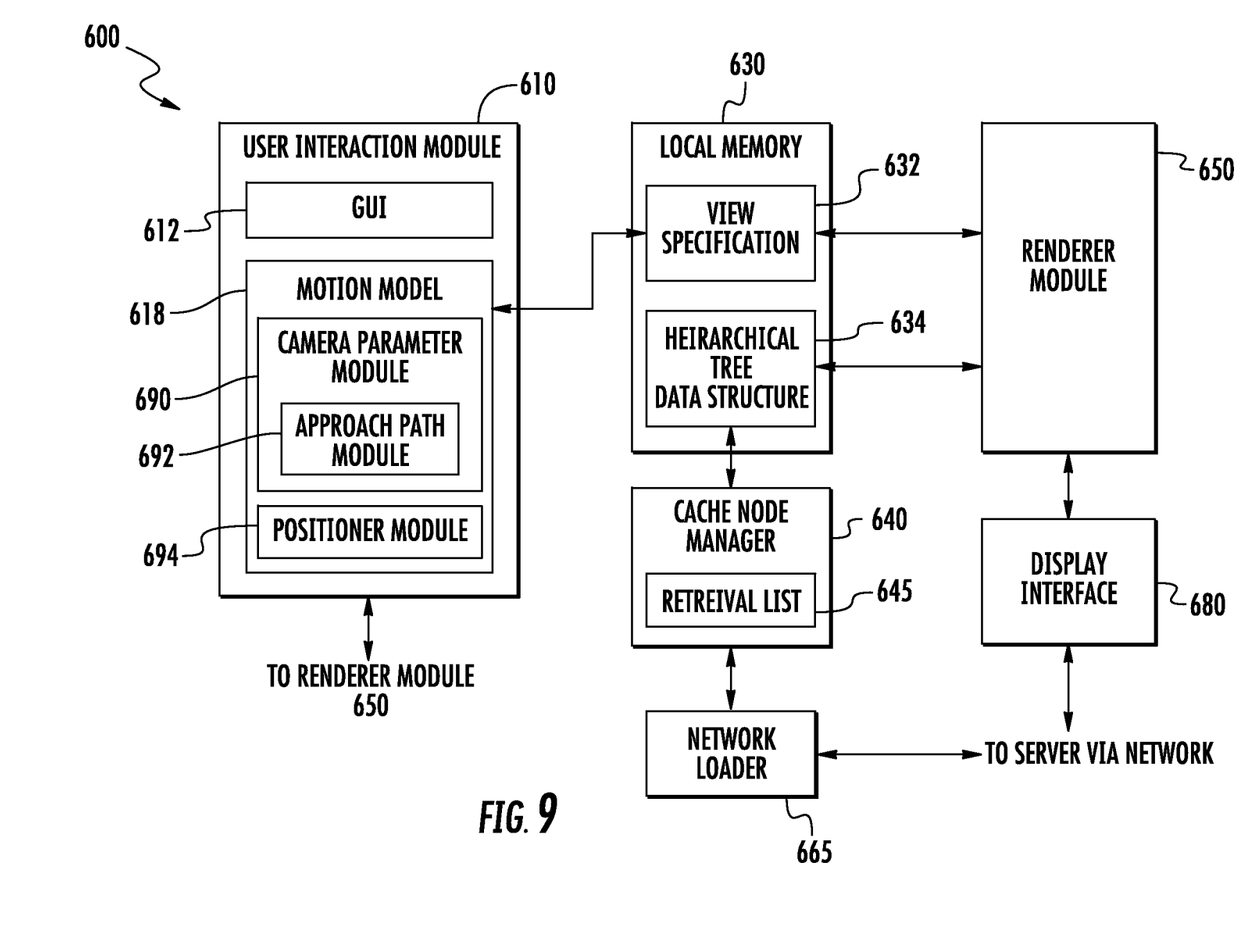
FIG. 9 depicts an exemplary system for navigating a virtual camera in a three dimensional environment according to an exemplary embodiment of the present disclosure.

FIG. 9 depicts the architecture of an exemplary client 600 of a geographic information system for navigating a virtual camera according to an exemplary embodiment of the present disclosure. In an embodiment, the client 600 includes a user interaction module 610, a local memory 630, a cache node manager 640, a renderer module 650, a network loader 665, and a display interface 680.

It will be appreciated that the term "module" refers to computer logic utilized to provide desired functionality. Thus, a module can be implemented in hardware, firmware, application specific circuits, and/or software controlling a processor. In one embodiment, the modules are program code files stored on the storage device, loaded into memory and executed by a processor or can be provided from computer program products, for example computer executable instructions, that are stored in a tangible computer-readable storage medium such as RAM, ROM, hard disk or optical or magnetic media.

As shown in FIG. 9, user interaction module 610 includes a graphical user interface (GUI) 612 and a motion model 618. Local memory 630 includes a view specification 632 and a hierarchical tree data structure 634, such as a quadtree or octree data structure, storing information associated with the geographic information system. Cache node manager 640 includes a retrieval list 645.

The components of the client 600 can be implemented, for instance, as software running on a client machine. Client 600 can interact with a server hosting the geographic information system to bring images of the Earth and other geospatial data to client 600 for viewing by a user. Together, the images of the Earth and other geospatial data form a three dimensional model in a three dimensional environment.

In general, the client 600 can operate as follows. User interaction module 610 can receive user input regarding a location that a user desires to view and, through motion model 618, constructs a view specification 632. Renderer module 650 uses the view specification 632 to decide what data is to be drawn and draws the data. Display interface 680 (e.g. display card) provides the data from the renderer module 650 for display on a suitable display device. Cache node manager 640 can run in an asynchronous thread and can build the hierarchical tree data structure 634 by populating it with nodes retrieved from a remote server via a network.

The renderer module 650 can traverse the hierarchical tree data structure 634 to draw the data specified by the view specification 632. Upon an attempt by the renderer modules 650 to access a node in the hierarchical tree data structure that has no data, the file name associated with the node can be provided to the cache node retrieval list 645. The network loader 665 can traverse the cache node retrieval list 645 to fetch data from the server.

Motion model 618 adjusts the position or orientation of a virtual camera in response to user input received via the GUI 612. Motion model 618 determines the view specification 632 based on the position and orientation of the virtual camera. During a transition of the virtual camera, the view specification 632 changes. The motion model 618 can use several sub-modules to control the transition of the virtual camera pursuant to the staged camera traversal according to exemplary aspects of the present disclosure. For instance, the motion model 618 can include a camera parameter module 690 and a positioner module 694.

Camera parameter module 690 determines one or more parameters for the virtual camera during the various stages of the staged camera traversal, for instance, according to any of the methods described herein. For instance, camera parameter module 690 can be configured to decrease a tilt angle parameter and increase an altitude parameter of the virtual camera during the launch stage of the staged camera traversal. The camera parameter module 690 can be further configured to increase a tilt angle parameter and decrease an altitude parameter of the virtual camera during the approach stage of the staged camera traversal. The camera parameter module 690 can be further configured to maintain a tilt angle parameter and an altitude parameter of the virtual camera during a traversal stage of the staged camera traversal.

The camera parameter module 690 can include one or more sub-modules, such as an approach path module 692. The approach path module 692 can be configured to determine one or more camera parameters such that an approach path of the virtual camera is aligned with a view direction associated with the a target location during an approach stage of a staged camera traversal. The approach path module 692 can determine the approach path by blending a first camera path that extends along the view direction associated with the target location and a second approach path that increased the tilt angle of the virtual camera.

Positioner module 694 moves the virtual camera according to the camera parameters determined by the camera parameter module 690. This results in an updated view specification 632 which is used by the renderer module 650 to draw data/information. In this manner, the motion model 618 can provide for the transition of a virtual camera in a geographic information system according to a staged camera traversal to assist the user in maintaining context during the transition.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method of navigating a virtual camera, comprising:

presenting a view of a three dimensional model from a virtual camera at a first location, the virtual camera having a first tilt angle at the first location;

receiving a user input requesting transition of the virtual camera to a second location, the virtual camera having a second tilt angle at the second location; and responsive to the user input and without further user interaction, transitioning the virtual camera from the first location to the second location according to a staged camera traversal having a launch stage, a traversal stage and an approach stage;

wherein transitioning the virtual camera from the first location to the second location according to the staged camera traversal comprises increasing an altitude of the virtual camera while decreasing a tilt angle of the virtual camera from the first tilt angle towards zero tilt during the launch stage, maintaining the tile angle of the virtual camera at a bout zero tilt during the traversal stage, and decreasing an altitude of the virtual camera while increasing the tilt angle of the virtual camera towards the second tilt angle during the approach stage;

wherein transitioning the virtual camera from the first location to the second location according to the staged camera traversal comprises aligning an approach path of the virtual camera with a view direction associated with the second location during the approach stage; and wherein aligning an approach path of the virtual camera with a view direction associated with the second location during the approach stage comprises:

determining a first camera path extending along the view direction associated with the target location;

determining a second camera path that increases the tilt angle of the virtual camera towards the second tilt angle and decreases the altitude of the virtual camera; and determining the approach path for the virtual camera by blending one or more camera parameters defined by the first camera path with one or more camera parameters defined by second camera path.

2. The computer-implemented method of claim 1, wherein the one or more camera parameters are blended using a spherical linear interpolation.

3. A computing system for navigating a virtual camera in a three-dimensional environment, the computing system comprising one or more processors configured to implement one or more modules, the one or more modules comprising:

a camera parameter module, the camera parameter module configured to determine one or more camera parameters for a virtual camera during a transition from a first location to a second location, the one or more camera parameters comprising a tilt angle of the virtual camera, the transition occurring in response to a user input requesting transition of the virtual camera to the second location; and a positioner module that positions the virtual camera according to the one or more camera parameters determined by the camera parameter module in response to the user input and without further user interaction;

wherein the camera parameter module is configured to determine the one or more camera parameters according to a staged camera traversal comprising a launch stage, a traversal stage, and an approach stage, the camera parameter module configured to increase the altitude of the virtual camera and decrease the tilt angle of the virtual camera during the launch stages, maintain the tilt angle of the virtual camera at about zero tilt during the traversal stage, and decrease the altitude of the virtual camera and to increase the tilt angle of the virtual camera during the approach stage;

wherein the camera parameter module comprises an approach path module, the approach path module configured to align an approach path of the virtual camera with a view direction associated with the second location during the approach stage; and wherein the approach path module is configured to align the approach path of the virtual camera with a view direction associated with the second location during the approach stage by performing operations, the operations comprising:

determining a first camera path extending along the view direction associated with the target location;

determining a second camera path that increases the tilt angle of the virtual camera and decreases the altitude of the virtual camera; and determining the approach path for the virtual camera by blending one or more camera parameters defined by the first camera path with one or more camera parameters defined by second camera path.

4. A computer-implemented method of navigating a virtual camera, the computer implemented method comprising:

presenting a view of a three dimensional model from a virtual camera at a first location, the virtual camera having a first tilt angle at the first location;

determining a second location for the virtual camera, the virtual camera having a second tilt angle at the second location;

in response to a user input requesting a transition to the second location and without further user interaction, transitioning the virtual camera from the first location to the second location according to a staged camera traversal having a launch stage, a traversal stage, and an approach stage;

wherein during the launch stage, transitioning the virtual camera without further user interaction comprises decreasing the tilt angle of the virtual camera from the first tilt angle towards zero tilt and increasing an altitude of the virtual camera;

wherein during the traversal stage, transitioning the virtual camera without further user interaction comprises maintaining the tilt angle of the virtual camera at about zero tilt;

wherein during the approach stage, transitioning the virtual camera without further user interaction comprises increasing the tilt angle of the virtual camera towards the second tilt angle and decreasing the altitude of the virtual camera such that an approach path of the virtual camera is aligned with a view direction associated with the second location; and wherein transitioning the virtual camera during the approach stage such that an approach path of the virtual camera is aligned with a view direction associated with the second location comprises:

determining a first camera path extending along the view direction associated with the target location;

determining a second camera path that increases the tilt angle of the virtual camera towards the second tilt angle and decreases the altitude of the virtual camera; and determining the approach path for the virtual camera by blending one or more camera parameters defined by the first camera path with one or more camera parameters defined by second camera path using a spherical linear interpolation.

* * * * *